United States Patent [19]

Altmejd

[11] Patent Number: 4,713,597
[45] Date of Patent: Dec. 15, 1987

[54] SILICON DIODE LOOPING ELEMENT FOR PROTECTING A BATTERY CELL

[75] Inventor: Morrie Altmejd, Toronto, Canada

[73] Assignee: Powerplex Technologies, Inc., Downsview, Canada

[21] Appl. No.: 804,468

[22] Filed: Dec. 4, 1985

[51] Int. Cl.$^4$ .............................................. H02J 7/00
[52] U.S. Cl. ........................................ 320/13; 320/6; 320/18; 361/124
[58] Field of Search ............... 320/13, 15, 18, 6, 2; 361/56, 124, 57, 91, 103, 104, 111

[56] References Cited

U.S. PATENT DOCUMENTS

| | | | |
|---|---|---|---|
| 2,624,033 | 12/1952 | Jacquier | 320/18 X |
| 3,102,222 | 9/1963 | Harmer | 320/15 X |
| 3,148,322 | 10/1964 | Booe et al. | 320/43 |
| 3,393,355 | 7/1968 | Whoriskey et al. | 320/18 |
| 3,402,325 | 10/1968 | Minks | 361/56 |
| 3,476,979 | 11/1969 | Stumpe et al. | 361/56 X |
| 4,303,877 | 12/1981 | Meinhold | 320/18 X |

OTHER PUBLICATIONS

Motorola, "Silicon Rectifier Handbook: Engineers' Guide to Silicon Rectifier Applications", p. 10-1.

Primary Examiner—Patrick R. Salce
Assistant Examiner—Anita M. Ault
Attorney, Agent, or Firm—Cushman, Darby & Cushman

[57] ABSTRACT

A special silicon diode is disclosed which is shunted across each cell in a series connected string of battery cells. In response to a cell failure which causes a cell to open circuit, all battery current is routed through the diode looping element. This current causes a permanent state change of the looping element thereby causing the looping element to become a permanent short circuit. Thus, the failed cell is effectively removed from the circuit.

14 Claims, 8 Drawing Figures

SILICON DIODE LOOPING ELEMENT FOR PROTECTING A BATTERY CELL

CROSS-REFERENCE TO RELATED APPLICATIONS

This application is related to the application entitled "Zener Diode Looping Element for Protecting a Battery Cell" filed this same day, Ser. No. 808,467, with a same inventor and commonly assigned.

FIELD OF THE INVENTION

This invention relates generally to battery technology. More specifically, this invention relates to a silicon diode element which is shunted across individual cells of a battery, to thus equalize charge between the various cells of a battery, and to shunt across any failed cells which occur in the battery. This element finds a special application in high temperature batteries, such as, for example, sodium sulfur type.

BACKGROUND OF THE INVENTION

Batteries store energy in chemical form. A rechargeable battery is a type of battery capable of transmuting electrical charge by storing it in the form of a reversible chemical reaction. When the battery is subsequently placed across a load, this reversible reaction reverses from the direction in the storage mode, thereby producing electrical energy for use by the load.

There are many popular types of rechargeable batteries. Perhaps the most popular are the nickel cadmium and lead acid types. These batteries generally operate over a usual range of ambient temperatures, and store a relatively small amount of charge.

Other types of battery, which are presently becoming more popular due to relatively high amount of energy storage, are generically labeled as "high temperature batteries". Examples of these kinds of batteries are electrochemical storage cells of the alkali metal and chalcogen type, sodium sulfur type, and lithium or lithium fluoride type. Operation of a high temperature battery requires it to be stored in an ambient environment with a temperature of between 300° C. and 500° C. Thus, although these high temperature batteries can store increased amounts of charge, they must be used under difficult operating conditions (very high temperatures). To compound this problem, typically the reliability of these batteries is reduced by any heat cycling of the batteries between ambient temperature and their proper operating temperature. Thus, when using these batteries, continuous reliable operation is highly advantageous. The importance of trouble free operation is made doubly evident when it is considered that even if servicing of these batteries is desired, the process requires a significant amount of cooling time before the parts of the batteries would be cool enough to be handled by service personnel. During this cooling time, the batteries will necessarily be out of service.

Single battery cells are generally available in the range of approximately a half a volt to five volts, with the specific voltage of the battery cell depending on properties of the chemical reaction which is occurring within the battery cell. Thus, to obtain a battery which has a higher voltage than this relatively low cell voltage, typically a plurality of cells are placed in series, to thereby add the respective cell voltages to obtain a resultant higher voltage. Sodium sulfur batteries, for example, have a cell voltage of approximately two volts. Thus, should a battery voltage of 48 volts be required, 24 of the cells would be required to be connected in series. However, this connection in series presents some problems with respect to operational reliability and to maximum battery efficiency.

One such problem is due to the fact that when a battery cell fails it will typically fail into the open circuit state. This failure into open circuit state would effectively destroy the utilitarianism of the entire battery. Thus, in the example given above of a 48-volt battery, a single cell of the 24 cells in the battery malfunctioning into an open circuit state would necessitate the replacement or repair of the entire battery. As such, it would be advantageous in the art to have a device which obviates this problem.

An early attempt at such a device is described in U.S. Pat. No. 2,624,033. This patent teaches placing individual diodes in parallel across each series connected cell. These diodes are placed so that normally a charged cell would reverse bias these diodes. However, when a cell either open circuits or is discharged close enough to zero volts, the related diode shunt across the particular cell will be forward biased. Thereby the particular cell will be effectively shorted out. The patented system has the disadvantage that in order for the diode to shunt across the particular cell, the diode must be forward biased and operating correctly. There is no permanent state change in the diode, and thus a failure of the diode would cause the battery to malfunction.

Another proposed solution to the problem is suggested in the disclosure of U.S. Pat. No. 3,102,222. This patent teaches a device which is specialized to high temperature catalytic battery cells, whereby by sensing the temperature of a particular battery cell, the condition of that particular cell can be approximated according to a predetermined algorithm. A switch 1 is normally closed and connected in series between the battery and the charging unit. The switch 1 is arranged to open when the temperature of the catalyst used in the battery reaches a predetermined value. The patent does not teach a method of shunting across individual cells in response to cell failure. Furthermore, this technique would only be applicable to high temperature battery cells.

A further proposed solution to the problem is taught in U.S. Pat. No. 4,303,877, the disclosure of which is expressly incorporated herein by reference. This patent teaches a plurality of battery cells of the electrochemical storage type in series. Shunted across each such cell is a temperature sensitive switch and a diode in series with heating device. In one preferred embodiment, when a cell fails into the open circuit state, the diode is forward biased thereby energizing the heating element. This heating element then heats the temperature sensitive switch, which permanently changes position—similar to a fusible link. This temperature sensitive switch thus permanently changes position in response to a cell of the battery failing. The failed cell is thereby effectively shorted across. While the general technique used is extremely effective, a disadvantage exists in the relative complexity and impracticality of the many components being used within a high temperature battery of 300°-500° C. The present invention overcomes all these problems by a single component performing all these functions as described herein. This operation of the present invention is extremely advantageous in high temperature battery cells, such as sodium sulfur. However, although the present invention finds a great usefulness in high temperature batteries such as sodium sulfur, it is not intended to be limited to these kinds of batteries and would find many applications in low temperature batteries such as nickel cadmium and lead acid as well. Since the requirements of a high temperature battery make maintenance of the battery difficult, these devices are particularly cost justified in these high temperature batteries.

Thus, it is an object of the present invention to overcome the problems stated above, by use of a specially constructed silicon diode placed in series across each battery cell. The preferred embodiment of the invention teaches a silicon diode looping element which, upon failure mode, permanently changes its conductive state to a short circuit, thus effectively shorting out the malfunctioning cell. Thus, the diode operates as a fusible link, permanently bypassing the failed cell, and enabling the battery to continue operating although at a slightly lower battery voltage.

BRIEF DESCRIPTION OF THE DRAWINGS

Other objects and purposes of the present invention will be discussed with reference to the accompany drawings wherein.

DETAILED DESCRIPTION OF THE PREFERRED EMBODIMENTS

Figure 1:
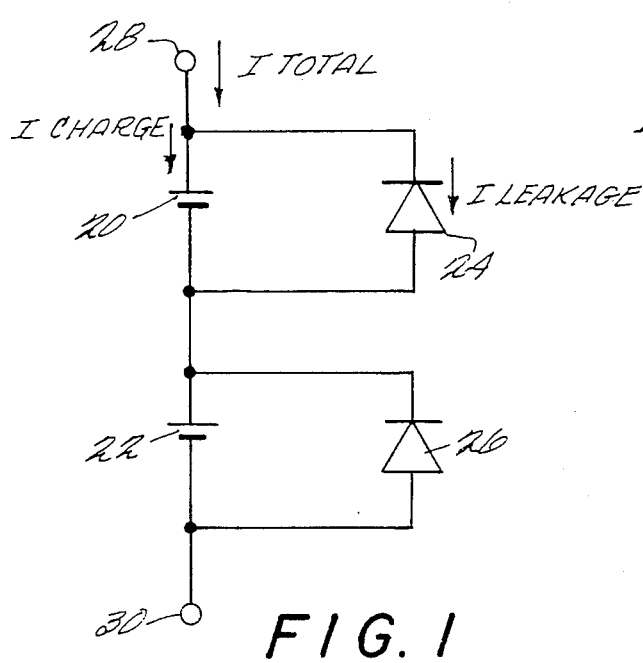
FIG. 1 shows a two-cell battery according to the present invention in a charging mode.

Referring to FIG. 1, a representative two-cell battery according to the present invention, with two cells 20 and 22 is shown. Shunted across cell 20 is looping element 24 and shunted across cell 22 is looping element 26. The battery voltage for this battery is available at terminals 28 and 30. FIG. 1 shows this battery in the charging mode with a current of I total being applied at terminals 28 and 30. Of this I total current, a current of I charge is applied to each battery with a leakage current (the reverse leakage current of the associated looping element) conducting through each looping element in the reverse direction. The leakage current (I leakage) is typically on the order of magnitude of microamps.

Figure 2:
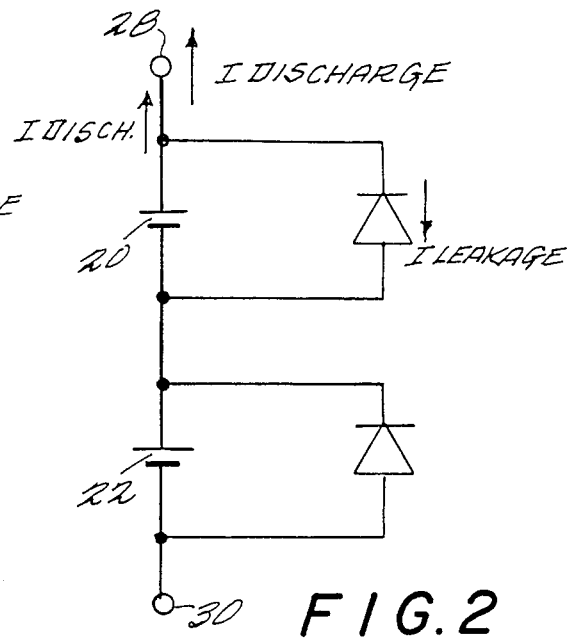
FIG. 2 shows a two-cell battery in a discharge mode.

FIG. 2 shows the same two-cell battery in a discharge mode. In this discharge mode, discharge current is available at terminals 28 and 30, and a similar leakage current passes through the reverse biased diode. This discharge current flows through both cells 20 and 22 in the cell string to be available at terminals 28 and 30.

Figure 3:
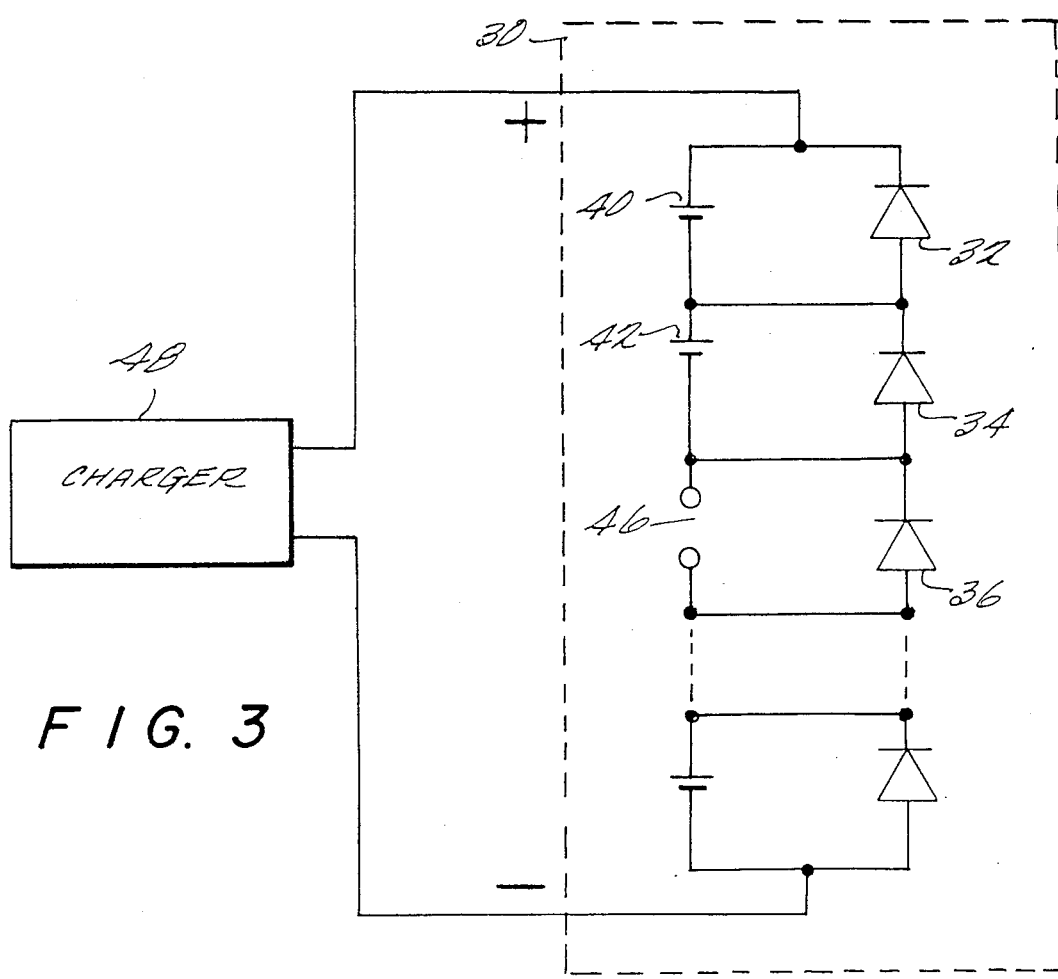
FIG. 3 shows a plurality of sodium sulfur cells connected in series in a charging circuit.

FIG. 3 shows a battery 30 according to the present embodiment with a plurality of looping elements shunted in parallel across each individual battery cell. The battery being used in the present embodiment is of the sodium sulfur type but could easily be any other type battery. Battery 30 has 24 cells—of which only four are shown in FIGS. 3 and 4.

Referring to FIG. 3, battery 30 has a plurality of cells, whereby each particular cell has a looping element shunted across it. For example, cell 40 is shunted by looping element 32. However, in battery 30, cell 46 has failed—and is thus shown as an open circuit. Obviously then, as shown in FIG. 3, cell 30 could not be charged by charger 48, as no complete charging path exists.

Figure 4:
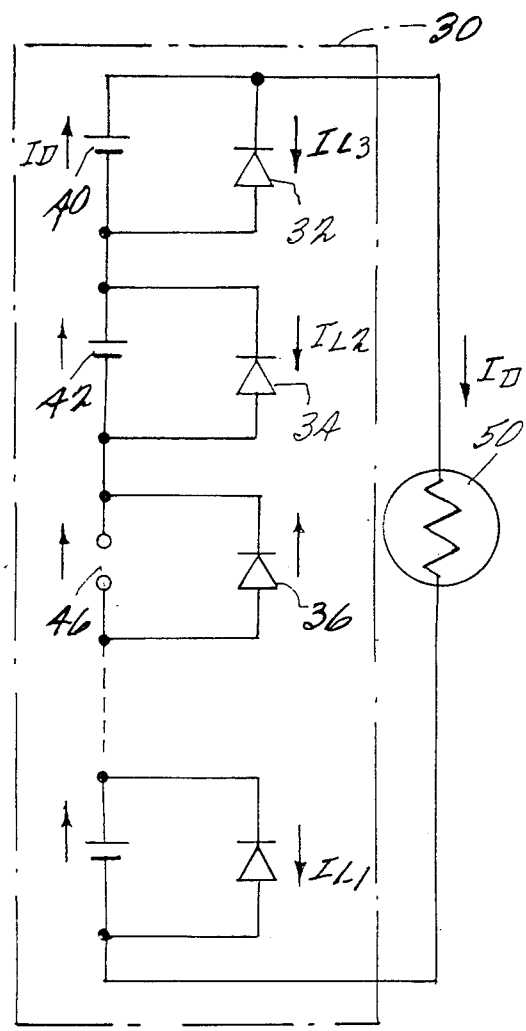
FIG. 4 shows the sodium sulfur cells connected to a load.

FIG. 4 shows the battery 30 being connected to a load 50. When connected to load 50, a current $I_D$ flows through load 50. Since battery cell 46 has been open circuited, this current will flow in a forward direction through looping element 36. Thus, the open circuit condition of cell 46 does not affect the integrity of the battery's operation in a discharge mode. This current $I_D$ also flows through cells 42 and 40. Each of cells 42 and 40 has a leakage current in the reverse direction through their associated looping element 34 and 32.

An explanation of the operation of looping element 36 follows.

Figure 5:
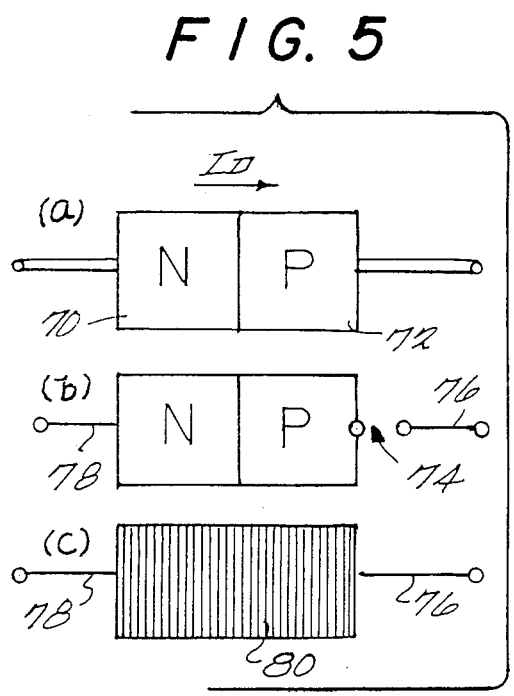
FIG. 5 shows the semiconductor layout of the looping element.

Referring to FIG. 5A, a typical semiconductor diode is shown. This diode has a current $I_D$ flowing in the direction shown, and thus is forward biased. The result of forward biasing a diode is well known to those skilled in the art, and thus the interaction of N-area 70 and P-area 72 will not be discussed herein. However, as a result of the current flow in the diode, a certain amount of this current is dissipated as heat. In the typical prior art semiconductor diode, as a result of excess heating of the diode, a packaging failure would occur, as shown diagrammatically in FIG. 5B. In FIG. 5B, the result of current flow through the P-N junction has caused excess heating. As a result of this, lead 76 has become dissociated from P-area 72 thereby forming a gap 74. Lead 78, however, is still attached to N-area 70.

Thus, the resultant effect of heat in a diode of the prior art is typically that package failure occurs as a result of the overcurrent condition, and thereby open circuits the device. Therefore, the device can no longer conduct current.

The effect of an overcurrent condition in the looping element of the present invention is shown in FIG. 5C. The inventors of the present invention have experimentally found that the inherent failure mode of a silicon diode is the short circuit state. However, in a conventional silicon diode, this inherent failure mode is not reached due to package failure prior to the short circuit state occurring. Therefore, the present invention uses a package which is specially constructed so that package failure will not occur due to an overcurrent condition. With the device constructed in this way, the result of an overcurrent condition is shown in FIG. 5C. In FIG. 5C leads 76 and 78 have remained affixed to silicon substrate 80. However, silicon substrate 80 has fused into a short circuit state. The mechanics of such fusing are not readily known to the inventors of the present invention, but have been observed experimentally to occur.

Figure 6:
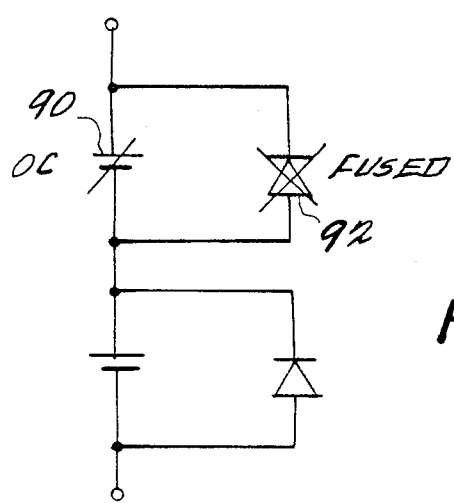
FIG. 6 shows the two-cell battery with the looping element fused into a permanently conducting state.

Referring to FIG. 6, the result of this open circuited battery cell is diagrammatically shown. Since cell 90 has become open circuited, the associated looping element 92 has become permanently fused, thereby effectively looping over the failed battery cell.

Figure 7:
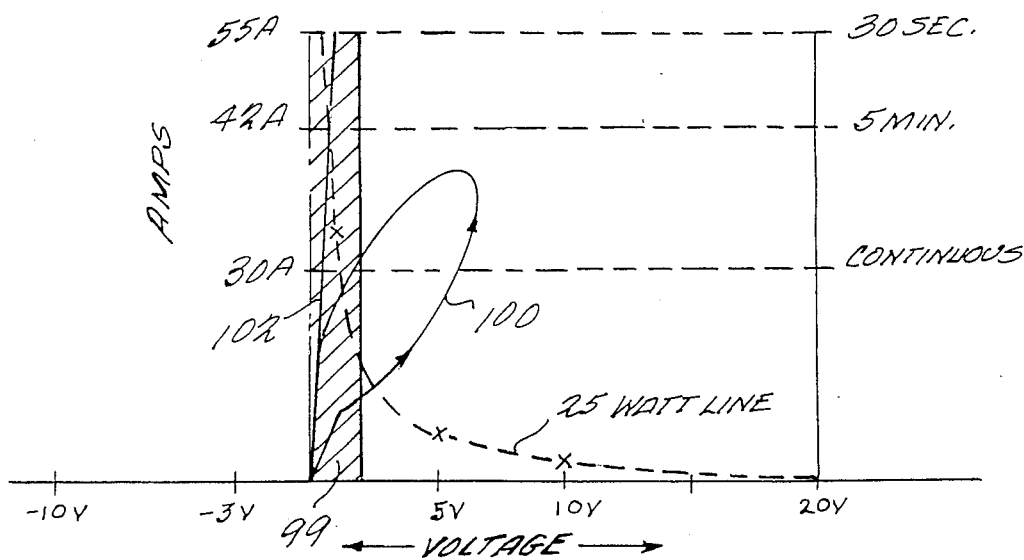
FIG. 7 shows an operating diagram showing the mode of changing the fusing state of the looping element.

Referring to FIG. 7, an operating diagram of the looping element is shown. This operating diagram shows the fused element in the hatched region 99. The amount of current to fuse the element, as a function of time necessary at the particular current is also shown.

For example, with the particular looping element chosen, at 55 amperes forward current, the device is fused in 30 seconds. At 42 amperes, the fusing time is five minutes, and below 30 amperes fusing of the device will not occur. These current values are typical and were chosen with the sodium sulfur battery in mind. It is readily obvious to one of ordinary skill in the art that the fusing point could be chosen to be any current by suitably adjusting the characteristics of the silicon substrate being used, and thus any kind of battery could be accommodated by this looping element. Referring to FIG. 7, curve 100 is a typical path that the looping element might travel in transition to its fused state. The rising part of curve 100 represents the period during which the diode is forward biased conducting large amounts of current. When fusing begins to occur, the curve begins to dip downward eventually ending up in the hatched area which represents the operating area of the fused element. Line 102 represents a typical voltage current characteristic of a fused element. Thus, when the element forward conducts large amounts of the current, it will undergo a permanent state change. Once undergoing this permanent state change, the looping element will thereinafter act as a fusible link which has been fused.

Figure 8:
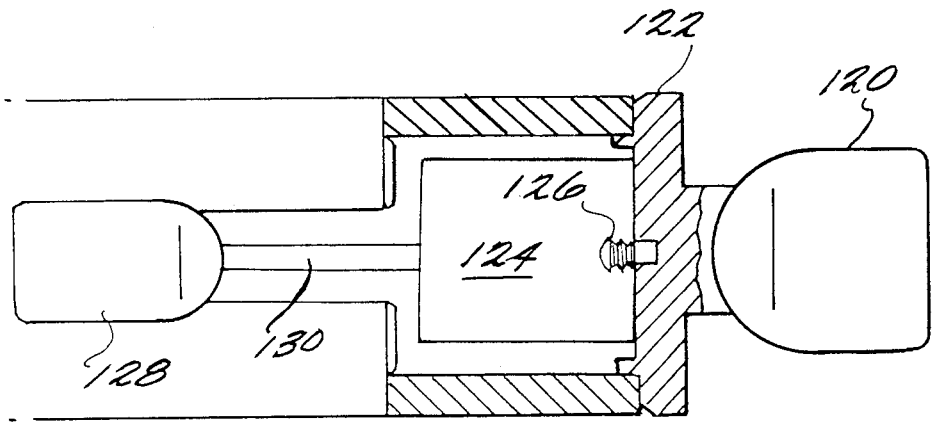
FIG. 8 shows a typical packaging which can be used for the looping element according to the invention.

Referring to FIG. 8, a diagram of a packaging layout of the preferred embodiment of the looping element is shown. This looping element diode has a first terminal 120 attached to case 122. Case 122 is in physical contact with silicon diode 124. Therefore, the possibility of the lead dissociating during overcurrent condition is obviated. Alternatively, stud 126 can be threadably attached through casing 122 into silicon diode 124. This aids in effective contact between first terminal 120 and the silicon diode, and minimizes the possibility of lead dissociation. Second terminal 128 is not physically connected to the package (or else shorting across the package would occur) and is thus connected to silicon diode 124 by a heavy wire 130. This wire must be securely welded to both first terminal 128 and to silicon diode 124, and must be chosen so that it can safely conduct the entire short circuit current capacity of the particular battery being shorted across. For example, in the present embodiment, wire 130 must be capable of conducting the full short circuit current of a sodium sulfur battery, which can be as much as 100 amps. Thus, through proper construction, the integrity of the package of the looping element can be ensured, thus allowing it to function as a fusible link.

Although only a few preferred embodiments have been described herein, it will be obvious to one of ordinary in the art that many modifications are possible. For instance, the batteries described could be any kind of battery including lithium fluoride, nickel cadmium, lead acid, or sodium sulfur as described. Accordingly, all such modifications are intended to be included in the following claims which are:

What is claimed is:
1. A battery comprising:
   a plurality of battery cells connected in series;
   a plurality of diode looping elements, one looping element being connected in parallel across each said cell, each said looping element having its cathode connected to the anode of each said cell and said looping element having its anode connected to the cathode of each said cell;
   said looping element being constructed so that when a predetermined amount of current is passed in a forward direction, said looping element fuses permanently into a short circuit state.
2. A battery as in claim 1 wherein said battery is sodium sulfur.
3. A battery as in claim 1 wherein said battery is of the alkali/chalcogen type.
4. A battery as in claim 1 further comprising terminal means on said battery for coupling a voltage produced by said series connected cells to an outside source.
5. A battery as in claim 1 wherein said predetermined amount of current is less than the expected output current of said battery.
6. A battery as in claim 1 wherein each said looping element is housed in a package which is formed so that failure of said package on overcurrent will not occur.
7. A battery comprising:
   a plurality of battery cells connected in series;
   a plurality of diodes, one of said diode connected across each said battery cell so that each said diode is normally reverse biased when each said battery cell is fully charged;
   said diodes being specially constructed to fail due to overcurrent into a permanent short circuit condition, thereby shorting out an open circuited battery cell when said battery is in a discharge mode.
8. A battery as in claim 7 wherein said battery is of the high temperature type.
9. A battery as in claim 7 further comprising terminal means electrically coupled to said series connected battery cells for conducting the battery voltage.
10. A battery as in claim 9 further comprising a battery casing, encasing said cells and said diodes.
11. A battery as in claim 10 wherein said battery is of the high temperature type.
12. A battery comprising:
    a plurality of battery cells; and
    a plurality of diode looping elements, each cell having a diode looping element coupled in parallel therewith so that a cathode of said looping element is coupled to a positive terminal of the battery cell, each said looping element including a diode chip packaged so that package failure will not occur during overcurrent conditions, and formed so that a forward current of the battery flowing in a forward direction through said looping element causes said diode chip element to permanently fuse into a short circuit state.
13. A battery as in claim 12 wherein said looping element package includes a case, in physical contact with said diode chip.
14. A battery as in claim 12 wherein a breakdown voltage of said diode looping element is substantially equivalent to a fully charged cell voltage of said cell.

* * * * *